United States Patent Office 2,998,408
Patented Aug. 29, 1961

2,998,408
PROCESS FOR THE PREPARATION OF POLYMERIC POLYMETHYLENE TEREPHTHALATE USING CERTAIN POLYHYDRIC ORGANIC COMPOUNDS AS CATALYSTS
Gijsbertus J. Zoetbrood, Velp, Netherlands, assignor, by mesne assignments, to N.V. Onderzoekingsinstituut Research, Arnhem, Netherlands, a corporation of the Netherlands
No Drawing. Filed Apr. 23, 1956, Ser. No. 579,737
Claims priority, application Netherlands May 6, 1955
6 Claims. (Cl. 260—47)

This invention relates to the preparation of macromolecular polymethylene terephthalates by reacting a glycol of the $HO(CH_2)_nOH$ series, where $n$ is an integer from 2 to 10, and an ester-forming derivative of terephthalic acid. More particularly, the invention relates to the preparation of macromolecular polymethylene terephthalates by a procedure that involves carrying out the reaction between the selected reactants in the presence of a novel class of additives which enables one appreciably to accelerate the velocity or rate of polycondensation under otherwise identical conditions, or to carry out the polycondensation reaction at substantially decreased temperatures than otherwise, or both.

One of the principal objects of the present invention is to provide a new and improved method for preparing macromolecular polymethylene terephthalates by reacting glycols and appropriate esters or half esters of terephthalic acid. A still further object of the invention is to provide an improved method of the kind indicated in which, by carrying out the condensation reaction in the presence of a novel class of compounds, one is enabled to obtain the desired polycondensation products having good physical properties in a considerably shorter time and/or at a considerably lower temperature.

The manner in which these and other objects and features of the invention are attained will appear more fully from the following description thereof, in which reference is made to typical and preferred procedures in order to indicate more fully the nature of the invention, but without intending to limit the invention thereby.

It is already known to bring about the desired condensation to polymethylene terephthalates by heating a glycol of the $HO(CH_2)_nOH$ series, where $n$ is a number from 2 to 10, with an ester-forming derivative of terephthalic acid. Suitable ester-forming derivatives of terephthalic acid include the aliphatic, cycloaliphatic or aromatic esters or half esters of terephthalic acid, especially the lower alkyl esters such as dimethyl terephthalate. In the course of the reaction two stages are distinguishable, one of these being a first stage in which the ester-forming derivative of terephthalic acid is transesterified with the glycol, and a second stage in which the bis-(hydroxy alkyl)-terephthalate resulting from the first stage is polycondensed into the desired macromolecular polymethylene terephthalate product.

Many catalysts have been proposed for the transesterification reaction, as well as for favorably influencing the subsequent or second stage condensation reaction. The condensation catalysts may be present from the very beginning of the reaction or they may be added to the reaction mixture at the end of the first stage and before the second stage or polycondensation reaction has been started by subjecting the reaction mixture to more drastic reaction conditions such as by raising the temperature and lowering the pressure.

Very satisfactory results have been obtained by using as the transesterification catalyst zinc acetate and as the polycondensation catalyst an antimony compound such as antimony trioxide. When preparing polymethylene terephthalate from dimethyl terephthalic acid, relatively small proportions such as in the order of 0.015% by weight of transesterification catalyst such as zinc acetate and in the order of 0.02% by weight of polycondensation catalyst such as antimony trioxide, both based on the weight of the dimethyl terephthalic acid, have appeared to give the most satisfactory results.

According to the present invention, it has been discovered that surprisingly it is possible in carrying out the foregoing reactions to achieve a material acceleration of the polycondensation velocity or rate of reaction, and/or that the temperature at which the polycondensation reaction is carried out may be materially decreased, if one or more of a certain class of compounds be added to the reactants to be condensed, these compounds falling within the class of compounds having the general formula:

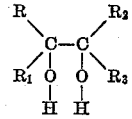

wherein R is an alkyl or aralkyl group with one or more aliphatically bound OH groups, and $R_1$, $R_2$ and $R_3$ may be hydrogen or organic groups; or substances from which said compounds may be formed under the reaction conditions.

Examples of the foregoing compounds, which are organic compounds having at least 3 aliphatically bound OH groups per molecule, are as follows:

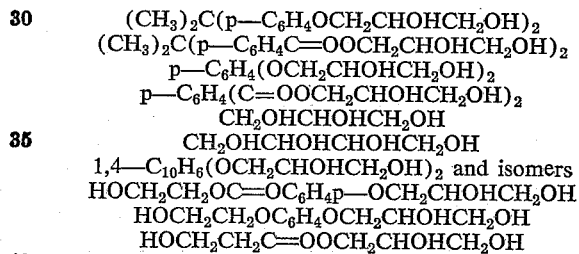

Instead of organic polyhydroxy compounds such as those specifically mentioned above, there may also be employed in carrying out the present invention substances from which organic polyhydroxy compounds of the specified type may be formed in situ under the reaction conditions. Examples of such compounds are organic epoxy compounds, of which the following may be mentioned by way of example:

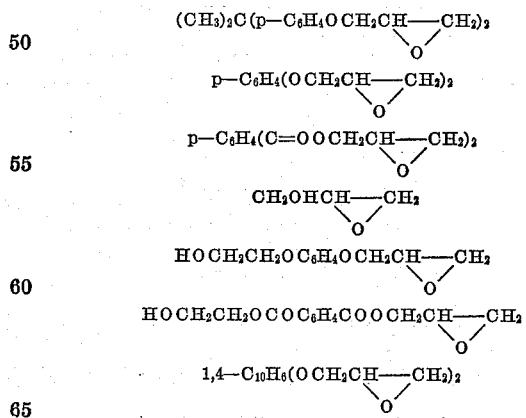

To obtain the desired effect only a small proportion of the additive need be employed in accordance with the present invention. For example, when starting from dimethyl terephthalate it is found that generally a small proportion, up to 1% by weight based on the dimethyl terephthalate, is sufficient. Proportions of additive as low as 0.1% or even as low as 0.05% by weight may under some circumstances be satisfactory, although generally speaking it is preferred to employ proportions at least somewhat nearer the middle of this range.

The addition of the organic polyhydroxy or polyhydroxy-forming compounds in question may take place before the start of the transesterification reaction or some time thereafter provided the addition is made before the ester interchange (first stage) has been completed. Generally speaking, however, it is more convenient and preferable to introduce the additive at the very start of the reaction.

The reaction accelerators employed according to the present invention are preferably used in combination with antimony trioxide as polycondensation catalyst. However, these accelerators may also be employed in combination with other catalysts for the transesterification and/or for the polycondensation stage, such as zinc oxide, zinc borate, zinc acetate, lead oxide, cobalt acetate, calcium acetate, etc., whereupon a considerable shortening of the polycondensation process is invariably obtained.

The heating schedule to be employed may be varied over wide limits without departing from the invention.

The polymeric materials prepared according to the present invention may be processed in conventional manner to shaped products, and especially threads, fibers and films. The properties of these products, such as strength and elongation, do not differ appreciably from those of products prepared from polyesters having the same viscosity in solution but prepared without the addition of the reaction accelerator substances according to the present invention.

In order to illustrate still more fully the nature of the present invention the following examples of typical procedure are set forth, it being understood that this description is presented by way of illustration only and not as limiting the scope of the invention.

Example I

The following mixture was heated in a glass reaction vessel for a period of 2.5 hours at atmospheric pressure and with constant agitation by stirring:

| | Parts by weight |
|---|---|
| Dimethyl terephthalate | 2400 |
| Ethylene glycol | 2240 |
| Zinc acetate (0.015% by weight) | 0.36 |
| Antimony trioxide (0.020% by weight) | 0.48 |
| 2,2 - bis(4 - hydroxy - epoxypropoxyphenyl) - propane (0.50% by weight) | 12 |

The percentages by weight are here based on the dimethyl terephthalate.

During the period of heating the temperature was gradually raised from 140° to 215° C., while methanol was distilled off. As soon as there was no further development of methanol and the transesterification could therefore be considered as having finished the first stage reaction product thus obtained, consisting of bis-2-hydroxyethylterephthalate was transferred to an autoclave having a glass lining in which the heating was continued with stirring at a temperature of 282° C. At the same time the pressure was gradually reduced to 0.2 mm. Hg. After reaching a pressure of 1 mm. Hg the heating was continued for a further period of 55 minutes. The vacuum was then released by supplying dry nitrogtn to the reaction zone.

The polymer thus obtained was as clear as water and its viscosity in solution amounted to 0.73 (measured here and elsewhere at 30° C. in a 1% metacresol solution of the polymer).

Under otherwise the same conditions, but in the absence of the propane derivative as additive, a polymer was obtained having a viscosity in solution of 0.49.

Example II

The process according to Example I was repeated with the same reaction components but with these differences: 6 parts by weight of 2,2-bis(4-hydroxyepoxypropoxyphenyl)-propane, corresponding to 0.25% by weight based on the dimethyl terephthalate, were added and the polycondensation stage was continued for a further 70 minutes after the pressure in the apparatus had been reduced to 1 mm. Hg. The water-clear polymer obtained had a viscosity in solution of 0.85. Without the addition a polymer was obtained having a viscosity in solution of 0.60.

Example III

The process according to Example I was repeated except that this time 4.8 parts by weight of 1,4-bis(2,3-dihydroxypropoxy)-benzene were added, corresponding to 0.20% by weight based on the dimethylterephthalate. The viscosity in solution of the water-clear polymer obtained amounted to 0.72, whereas without the addition of the benzene derivative the viscosity was 0.49.

Examples IV and V

The process according to Example III was repeated but the polycondensation stage was continued for 70 minutes and 90 minutes, respectively, after the vacuum in the apparatus had been reduced to 1 mm. Hg. The polymers obtained had a viscosity in solution of 0.98 and 1.11, respectively. Without the addition the viscosity was 0.60 and 0.70, respectively.

Example VI

The process according to Example I was repeated except that instead of 12 parts by weight of 2,2-bis(4-hydroxyepoxypropoxyphenyl)-propane, 5.0 parts by weight of glycerol, corresponding to 0.21% by weight based on the dimethylterephthalate, were added, and the polycondensation was continued for a further 70 minutes after the pressure in the apparatus was diminished to 1 mm. Hg. The polymer obtained had a viscosity in solution of 0.88. Without the addition of glycerol the viscosity in solution was 0.60.

Example VII

The process according to Example VI was repeated except that 5 parts by weight of erythritol were added instead of glycerol, the amount of erythritol corresponding to 0.21% by weight based on the dimethylterephthalate. The polymer obtained had a viscosity in solution of 0.81.

From the foregoing description it will be noted that by applying the additive substances according to the present invention polycondensation products may be obtained of which the viscosity is appreciably higher than that of polycondensation products prepared without these additive substances but under otherwise the same conditions. Moreover, it will be observed that in the preparation of these polycondensation products having a given viscosity the reaction time is considerably shortened by the application of the new accelerators. This in turn means that by proceeding according to the present invention the production capacity of an existing installation is considerably increased.

While specific examples of preferred methods and additive substances embodying the present invention have been set forth above, it will be apparent that many changes and modifications may be made therein without departing from the spirit of the invention. It will therefore be understood that the examples cited and the particular proportions and methods of operation set forth above are intended to be illustrative only and are not intended to limit the scope of the invention.

What is claimed is:

1. Process for preparing filament- and film-forming polymeric polymethlyene terephthalates, which comprises forming a reaction mixture of a glycol of the general formula $HO(CH_2)_nOH$ in which $n$ is an integer from 2 to 10 and a methyl terephthalate, subjecting the reaction mixture to an ester interchange reaction in the presence of an esterification catalyst, incorporating in said reaction mixture, before the ester interchange reaction has been completed, from 0.05 to 1% by weight of the methyl terephthalate of an additive that accelerates the polycondensation reaction, said additive being an organic epoxy compound selected from the group consisting of

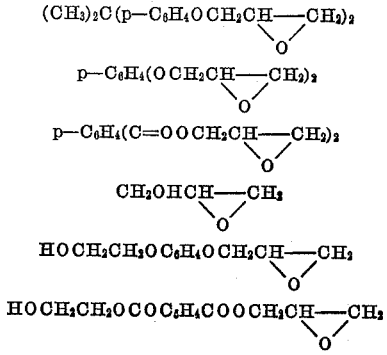

and

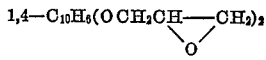

and thereafter subjecting the product of the ester interchange reaction to a polycondensation reaction in the presence of a polycondensation catalyst.

2. A process as defined in claim 1 wherein the polycondensation reaction is carried out in the presence of antimony trioxide as polycondensation catalyst.

3. Process for preparing filament- and film-forming polymeric polymethylene terephthalates, which comprises forming a reaction mixture of a glycol of the general formula $HO(CH_2)_nOH$ in which $n$ is an integer from 2 to 10 and a methyl terephthalate, subjecting the reaction mixture to an ester interchange reaction in the presence of an esterification catalyst, incorporating in said reaction mixture, before the ester interchange reaction has been completed, from 0.05 to 1% by weight of the methyl terephthalate of an additive that accelerates the polycondensation reaction, said additive being an organic epoxy compound having the general formula

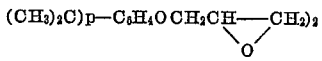

and thereafter subjecting the product of the ester interchange reaction to a polycondensation reaction in the presence of antimony hydroxide as polycondensation catalyst.

4. Process for preparing filament- and firm-forming polymeric polymethylene terephthalates, which comprises forming a reaction mixture of ethylene glycol, dimethyl terephthalate, subjecting the reaction mixture to an ester interchange reaction in the presence of an esterification catalyst, incorporating in said reaction mixture, before the ester interchange reaction has been completed, from 0.05 to 1% by weight of the dimethyl terephthalate of an additive that accelerates the polycondensation reaction, said additive being an organic epoxy compound selected from the group consisting of

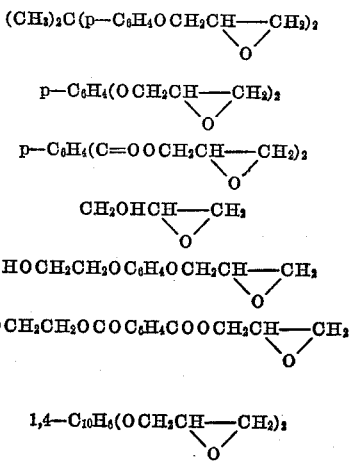

and

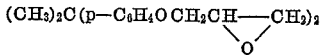

and thereafter subjecting the product of the ester interchange reaction to a polycondensation reaction in the presence of a polycondensation catalyst.

5. A process as defined in claim 4 wherein the polycondensation reaction is carried out in the presence of antimony trioxide as polycondensation catalyst.

6. Process for preparing filament- and film-forming polymeric polymethylene terephthalates, which comprises forming a reaction mixture of ethylene glycol, dimethyl terephthalate, subjecting the reaction mixture to an ester interchange reaction in the presence of an esterification catalyst, incorporating in said reaction mixture, before the ester interchange reaction has been completed, from 0.05 to 1% by weight of the dimethyl terephthalate of an additive that accelerates the polycondensation reaction, said additive being an organic epoxy compound having the general formula $$(CH_3)_2C(p-C_6H_4OCH_2CH{-}CH_2)_2$$
$$\diagdown O \diagup$$

and thereafter subjecting the product of the ester interchange reaction to a polycondensation reaction in the presence of antimony hydroxide as polycondensation catalyst.

References Cited in the file of this patent
UNITED STATES PATENTS

| | | |
|---|---|---|
| 2,437,046 | Rothrock et al. | Mar. 2, 1948 |
| 2,647,885 | Billica | Aug. 4, 1953 |
| 2,720,500 | Cody | Oct. 11, 1955 |
| 2,720,502 | Caldwell | Oct. 11, 1955 |
| 2,721,854 | Kohl | Oct. 25, 1955 |
| 2,739,957 | Billica | Mar. 27, 1956 |
| 2,895,946 | Huffman | July 21, 1959 |